United States Patent [19]

Tsuchiya et al.

[11] Patent Number: 4,694,154

[45] Date of Patent: Sep. 15, 1987

[54] INSTRUMENTS FOR MEASURING LIGHT PULSES CLOCKED AT HIGH REPETITION RATE AND ELECTRON TUBE DEVICES THEREFOR

[75] Inventors: Yutaka Tsuchiya; Musubu Koishi; Akira Takeshima, all of Hamamatsu, Japan

[73] Assignee: Hamamatsu Photonics Kabushiki Kaisha, Hamamatsu, Japan

[21] Appl. No.: 868,110

[22] Filed: May 29, 1986

Related U.S. Application Data

[62] Division of Ser. No. 557,252, Dec. 1, 1983, Pat. No. 4,645,918.

[30] Foreign Application Priority Data

Dec. 7, 1982 [JP] Japan .................. 57-214143
Jan. 21, 1983 [JP] Japan .................. 58-9040
Jan. 21, 1983 [JP] Japan .................. 58-9041

[51] Int. Cl.$^4$ ............................ H01J 31/50
[52] U.S. Cl. ................. 250/213 VT; 313/530; 313/532
[58] Field of Search ......... 250/213 R, 213 VT, 458.1, 250/461.1; 313/528, 530, 532–536, 105 R, 1; 315/1, 3, 9; 356/318

[56] References Cited

U.S. PATENT DOCUMENTS

| | | | |
|---|---|---|---|
| 3,329,856 | 7/1967 | Foote ................................ | 313/536 |
| 3,391,295 | 7/1968 | Clayton ............................ | 313/536 |
| 4,413,178 | 11/1983 | Mourou et al. ............. | 250/213 VT |
| 4,461,572 | 7/1984 | Tsuchiya ......................... | 356/318 |

FOREIGN PATENT DOCUMENTS 1443926 7/1976 United Kingdom ............... 313/532

*Primary Examiner*—Edward P. Westin
*Attorney, Agent, or Firm*—Spencer & Frank

[57] ABSTRACT

An electron tube device for measuring light pulses generated at a high repetition rate which includes an electron tube, power supply device and deflection voltage generator. The electron tube has a photocathode, focusing electrode, deflection electrodes, slit electrode, dynodes and a collector electrode positioned within an evacuated envelope. The power supply device supplies voltages to the dynodes and to the focusing and slit electrodes, and the deflection voltage generator supplies deflection voltages to the deflection electrodes which successively change in phase with respect to light pulses impinging on the photocathode so that different portions of the light pulses can be successively sampled.

2 Claims, 16 Drawing Figures

F I G. 10
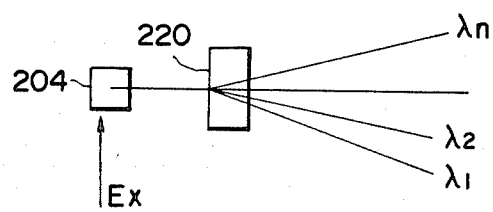
F I G. 11
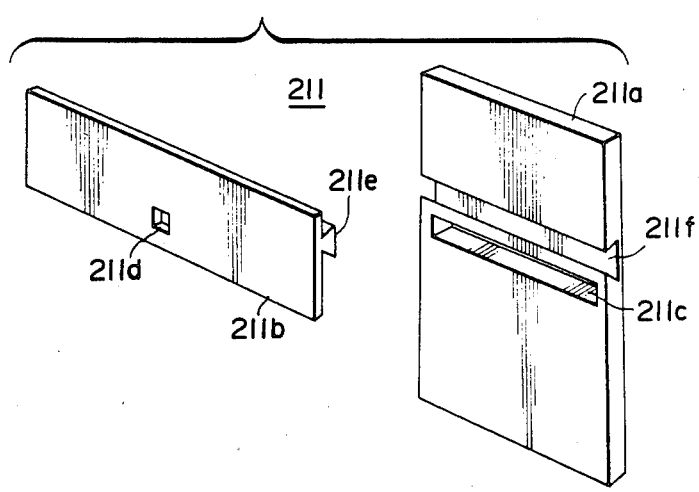
F I G. 12
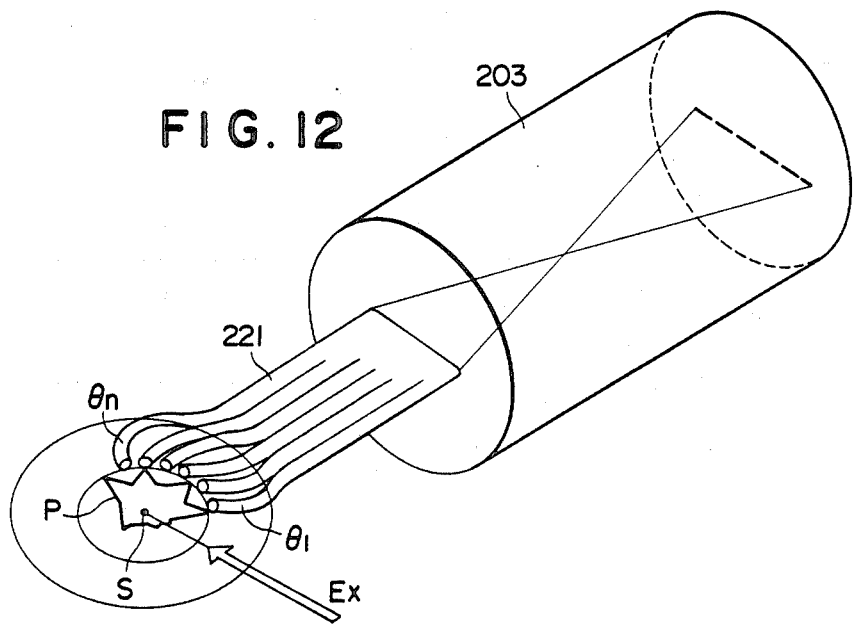

INSTRUMENTS FOR MEASURING LIGHT PULSES CLOCKED AT HIGH REPETITION RATE AND ELECTRON TUBE DEVICES THEREFOR

This is a division of application Ser. No. 06/557,252 filed Dec. 1, 1983, now U.S. Pat. No. 4,645,918.

BACKGROUND OF THE INVENTION

The present invention relates to instruments for measuring light pulses clocked at a high repetition rate in the same interval with the same waveform, and also to electron tube devices for measuring the light pulses.

The streaking camera is a device for monitoring the intensity of light changing with time at high speed.

The streaking tube used in each streaking camera is an electron tube which contains a pair of deflection electrodes located between the photocathode and the phosphor layer.

If light is incident on the photocathode of the streaking tube, the photocathode can emit photoelectrons. When an electric field is applied across a pair of deflection electrodes during motion of photoelectrons traveling from the photocathode to the phosphor layer, changes in brightness in the direction of the electron beam moving on the phosphor layer appear corresponding to changes in the incident light.

The tube to obtain changes in brightness is called the streaking tube.

The streaking camera consists of a streaking tube as described above, an optical system used to project incident light being measured onto the phosphor layer, and a power supply used to feed power to the streaking tube.

The streaking image on the phosphor layer, after being picked up by a television camera, can be analyzed by processing the video signal obtained by the television camera. When the streaking image of light pulses clocked at a high repetition rate is repetitively picked up for one field period of time, a superposed streaking image with a large amplitude can favorably be obtained.

The dark current inherent to the streaking tube is integrated during the scanning time, and this current makes measurement of brightness in the low intensity range inaccurate.

The data obtained has a limited contrast range due to the limited dynamic range of the built-in video signal amplifier, and no more excessive dynamic range can be expected.

An analysis of the streaking image of the light pulses clocked at a high repetition rate with a dynamic range of $10^4$ to $10^8$ is required, but it cannot be done by the conventional technique.

The above are the problems to be solved.

The first objective of the present invention is to present an instrument for analyzing the streaking image of light pulses clocked at a high repetition rate with an extended dynamic range realized by sensing the light pulses by using a photoelectron multiplier tube as a photoelectric conversion device.

The second objective of the present invention is to present another instrument for analyzing an arbitarily selected portion of the streaking image of the light pulses clocked at a high repetition rate with an extended dynamic range realized by picking up the arbitrarily selected portion of the streaking image on the phosphor layer with a narrow-width stripe perpendicular to the time coordinate on the phosphor layer and then by multiplying the selected portion of the streaking image with a photoelectron multiplier tube.

The third objective of the present invention is to present a new type of electron tube device suitable for measuring light pulses of the same waveform clocked at an unchanged repetition rate with an extended dynamic range.

SUMMARY OF THE INVENTION

In accordance with the first principle of the present invention to accomplish its first objective, the instrument for measuring light pulses clocked at the same repetition rate with the same waveform basically consists of a streaking camera, sampling means to partly pick up the streaking image on the phosphor layer of the streaking tube in the direction perpendicular to the time coordinate, a photoelectron multiplier tube to convert the streaking image picked up by the sampling means and to multiply the obtained electrons, and an output device to issue the output of the photoelectron multiplier tube in terms of the output of the delay time control signal generator in the streaking camera.

The streaking camera consists of a streaking tube, optical means to accept the light pulses to be measured, which are incident on the photocathode of the streaking tube, a synchronizing signal generator to generate the synchronizing signals issued synchronously with the light pulses, a delay time control signal generator to generate the control signal for delaying the synchronizing signals in sequence, a delay circuit to delay the output of the synchronizing signal generator synchronized with the control signal, and deflection voltage connection means to convert the output of the delay circuit into the deflection voltage and to feed the converted deflection voltage signal to the deflection electrode of the streaking tube.

The instrument forms a series of streaking images on the phosphor layer of the streaking tube so that the streaking images of the light pulses repetitively incident on the streaking tube are displaced with respect to each other.

The sampling means consists of a long narrow-width slit arranged perpendicular to the direction that a displacement can occur, and these means are used to sequentially pick up different portions of the streaking image by the sampling technique. The photoelectron multiplier tube converts the linear optical image into the corresponding electric signal and then multiplies electrons obtained by the conversion. The output of the photoelectron multiplier tube is fed to an output device. The output device produces an accurate profile of a single light pulse synchronized with the output of the delay time control signal generator.

In accordance with the second principle of the present invention to accomplish its second objective, the instrument for measuring the light pulses clocked at the same repetition rate with the same waveform basically consists of a streaking camera, sampling means to partly pick up an arbitrary portion of the streaking image on the phosphor layer forming a narrow-width slit in the direction perpendicular to the time coordinate on the phosphor layer, a photoelectron multiplier to convert the streaking image picked up by the sampling means and to multiply the obtained electrons, and an output device to display the output of the photoelectron multiplier in terms of the output of the delay time control signal generator in the streaking camera.

The streaking camera consists of a streaking tube, optical means to accept the light pulses to be measured, which is incident on the photocathode of the streaking tube, so that the location in the direction perpendicular to the time coordinate of the streaking image on the phosphor layer of the streaking tube may be meaningful, a synchronizing signal generator to generate the synchronizing signals issued synchronously with the light pulses, a delay time control signal generator to generate the control signal for delaying the synchronizing signals in sequence, a delay circuit to delay the output of the synchronizing signal generator synchronized with the control signal, and deflection voltage connection means to convert the output of the delay circuit into the deflection voltage and to feed the converted deflection voltage signal to the deflection electrode of the streaking tube.

The instrument forms a series of streaking images on the phosphor layer of the streaking tube so that the streaking images of the light pulses repetitively incident on the streaking tube are displaced with respect to each other.

The sampling means consist of a long, narrow-width slit arranged perpendicular to the direction that a displacement can occur, and these means are used to sequentialy pick up different portions of the streaking image by a sampling technique.

Sampling means pick up an arbitrary portion of the streaking image on the phosphor layer so that a narrow-width slit is formed in the direction perpendicular to the time coordinate on the phosphor layer. The photoelectron multiplier tube converts the linear optical image into the corresponding electrical signal and then multiplies electrons obtained by the conversion. The output of the photoelectron multiplier tube is fed to the output device. The output device produces an accurate profile of a certain portion which is meaningful in the time domain or space domain in a single light pulse synchronized with the output of the delay time control signal generator.

A first electron tube device for measuring the light pulses clocked at a high repetition rate in accordance with the third embodiment of the present invention is the electron tube device for measuring the light pulses clocked at a high repetition rate in the same interval with the same waveform. This electron tube device consists of an electron tube whose vacuum envelope sequentially includes a photocathode, a set of focusing electrodes, a pair of deflection electrodes, a slit electrode with a slit arranged perpendicular to the deflection field across a pair of the deflection electrodes, a group of dynodes to multiply electrons passing through the slit, and a collector electrode to collect electrons multiplied by the group of dynodes, a power supply device to supply high voltages to the photocathode, the focusing electrode, and the slit electrode, so that the applied voltages to the respective electrodes are higher than those to the preceding electrodes, and also to supply voltages to the group of dynodes for electron multiplication; and a deflection voltage generator to supply the deflection voltages changing in phase in sequence synchronized with the light pulses to the deflection electrode. A first electron tube device built in accordance with the present invention picks up different portions of the light pulses clocked at a high repetition rate so that these different portions are successively sampled in order.

In accordance with the device configuration, the light pulses repetitively incident on the photocathode are converted into the corresponding electric signals and these are deflected by the deflection voltages synchronized with the incident light pulses. The deflection voltages have different phases while being synchronized with the incidence of light pulses, and thus different portions of the light pulses are successively picked up, in order, through the slit of the slit electrode. The obtained signal formed by the different portions of the light pulses is multiplied by the group of dynodes, and then it is collected at the collector electrode.

An accurate profile of a single light pulse can be retrieved by processing the output of the collector electrode.

A second electron tube device for measuring the light pulses clocked at a high repetition rate in accordance with the third embodiment of the present invention is the electron tube device for measuring the light pulses clocked at a high repetition rate in the same interval with the same waveform. The electron tube device consists of a first electron tube whose vacuum envelope includes a photocathode, a set of focusing electrodes, a pair of deflection electrodes, a slit electrode with a slit arranged perpendicular to the deflection field across a pair of the deflection electrodes, and a phosphor layer to emit the light pulses due to electrons passing through the slit; second electron tube consisting of a secondary electron multiplier tube arranged so that the photocathode faces the phosphor layer; a first electron tube power supply device to supply high voltages to the photocathode, the focusing electrode, and the slit electrode, where the applied voltages to the respective electrodes are higher than those to the preceding electrodes; second electron tube power supply; a deflection voltage generator, operating in synchronization with the light pulses to be measured, to supply the deflection voltages whose phase sequentially change in order. The second electron tube device is used to sequentially pick up, in order, different portions of the light pulses clocked at a high repetition rate.

In accordance with the device configuration, the light pulses repetitively incident on the photocathode are converted into the corresponding electric signals and these are deflected by the deflection voltages synchronized with the incident light pulses. The deflection voltages have different phase in accordance with the incident of light pulses, and thus different portions of the light pulses are successively picked up, in order, through the slit of the slit electrode. The obtained linear image stimulates the phosphor layer. The intensity of brightness of the phosphor layer is enhanced due to multiplication of electrons by using a secondary electron multiplier tube consisting of a second electron tube device. Electrons multiplied by the secondary electron multiplier tube are collected at the collector electrode.

An accurate profile of a single light pulse can be retrieved by processing the output of the collector electrode.

BRIEF EXPLANATION OF THE DRAWINGS

Embodiments of the present invention will be described hereinafter referring to the attached drawings which will be summarized as follows:

FIG. 10 shows a planar view depicting the relation between the beam source of the light pulses to be measured and the spectroscope.

FIG. 11 shows an expanded perspective view of the partial beam pick-up plate.

FIG. 12 shows a perspective view of the embodiment of the streaking tube and optical means which are used in an instrument suitable for measuring the light pulse beam with a specific directional pattern.

DESCRIPTION OF EMBODIMENTS OF THE INVENTION

Figure 1:
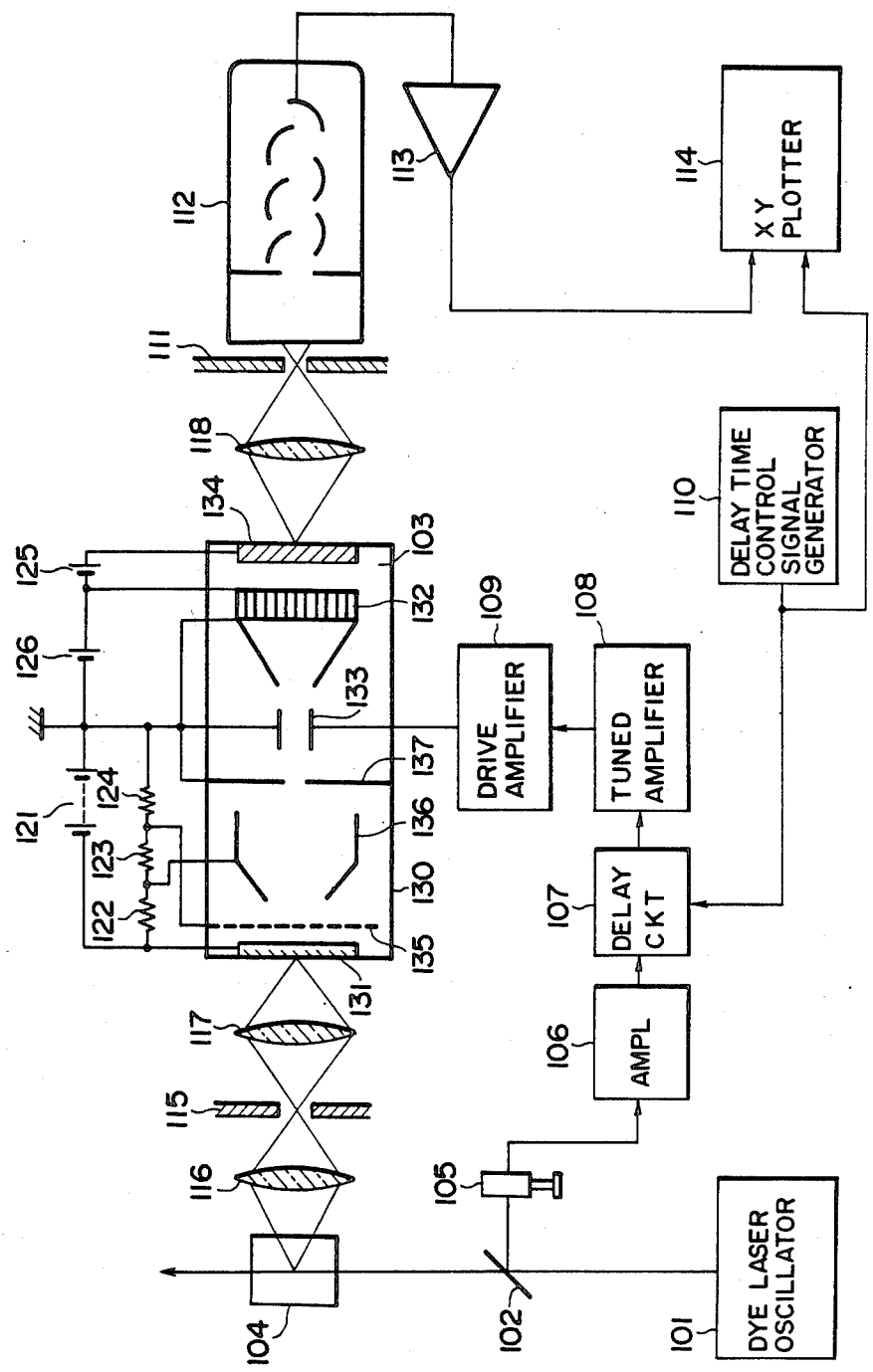
FIG. 1 shows a block diagram of the first embodiment of an instrument for measuring light pulses clocked at a high repetition rate in accordance with the present invention.

FIG. 1 shows a block diagram of the instrument for analyzing the streaking image of light pulses clocked at a high repetition rate in accordance with the first embodiment of the present invention. The instrument built in accordance with the first embodiment of the present invention is used to observe a streaking image with a diminished intensity of light due to fluorescence of a hematoporphyrin derivative so as to specify the hematoporphyrin derivative recognized as an organic molecular crystal being used to diagnose and cure cancer.

The structure of the streaking tube used as a main part of the streaking camera will be described hereinafter.

Photocathode 131 is formed on the inner wall of the incident plane within the vacuum envelope of streaking tube 103, and phosphor layer 134 is formed on the opposite inner wall thereof.

Mesh electrode 135, focusing electrode 136, aperture electrode 137, a pair of deflection electrodes 133 and micro-channel-plate 132 are sequentially arranged in the space between photocathode 131 and phosphor layer 134.

Micro-channel-plate 132 is installed in a frame having an outer diameter of 32.7 mm and an inner diameter of 27 mm, and it consists of a plurality of channels or secondary electron multipliers arranged in parallel. Each channel has an inner diameter of 25 $\mu$m, and channels arranged in 32 $\mu$m spans between adjacent channel centers. The length of each channel is 50 times the inner diameter thereof.

The input electrode lead of micro-channel-plate 132 is grounded and a voltage of 900 volts is applied to the output electrode lead thereof. When an electron is incident on the input electrode of micro-channel-plate 132, electrons of the order of $10^3$ are generated from the output electrode thereof.

The input electrode lead of micro-channel-plate 132 and aperture electrode 137 are grounded. A DC voltage of $-4000$ volts is applied to photocathode 131 from power supply 121. A DC voltage of $-300$ volts to mesh electrode 135 and a DC voltage of $-3100$ volts to focusing electrode 136 are fed through a dividing network consisting of resistors 122, 123, and 124 from power supply 121. A DC voltage greater than the DC potential on the output electrode of micro-channel-plate 132 by 3000 volts is applied to phosphor layer 134 from power supply 125. A DC voltage of 1500 volts is applied to the output electrode of micro-channel-plate 132 from power supply 126.

The laser pulse beam issued from dye laser oscillator 101 is incident on hematoporphyrin derivative 104 which can emit the light pulses that impinge on the photocathode 131.

Dye laser oscillator 101 can emit 600 nm light pulses with a pulse width of 5 ps clocked at a repetition rate in the range of 80 to 200 MHz. Dye laser oscillator 101 repetitively issues a stimulating signal at intervals to the object to be measured by the instrument built in accordance with the present invention, and it constitutes a stimulating signal source which causes fluoresence to occur in response to the stimulating signal.

Beam splitter 102 consisting of a semi-transparent mirror causes the light pulses from the dye laser oscillator 101 to branch into hematoporphyrin derivative 104 and PIN diode 105. In other words, part of the laser pulse beam strikes hematoporphyrin derivative 104 to be measured.

Heamtoporphyrin derivative 104 can emit light pulses due to fluorescence which occurs in synchronization with the laser pulse beam.

Light pulses due to the fluorescence can be input to phosphor layer 131 of streaking tube 103 through optical means through which the light pulses can pass in the streaking camera. The optical means consist of slit 115 arranged in a direction perpendicular to the light pulses, and a pair of lenses 116 and 117. Light pulses caused by fluorescence from hematoporphyrin derivative 104 are projected onto a certain location on phosphor layer 131 by the optical means so that a narrow-width stripe may be formed in the direction in which streaking tube 103 is scanned. The other portion of the laser pulse beam is incident on PIN photodiode 105.

PIN photodiode 105 is a photoelectric device with a very fast response time, and it can generate pulse currents responding to the incident laser pulse beam. The output of PIN photodiode 105 is amplified by amplifier 106, and thus a synchronizing signal is formed. The output terminal of amplifier 106 is connected to a delay circuit 107.

Delay circuit 107 is used to delay the synchronizing signal by an appropriate amount of time in accordance with the timing signal issued from delay time control signal generator 110.

Figure 2:
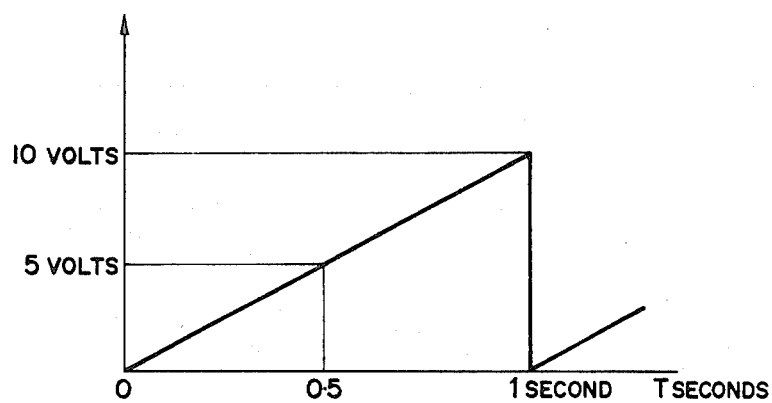
FIG. 2 shows the waveform of the output signal of the delay time control signal generator of FIG. 1.

The sweeping voltage applied to a pair of deflection electrodes 133 when photoelectrons from photocathode 131 pass through the deflection electrodes 133 is delayed in phase, and thus it is synchronized with the delayed synchronizing signal. Delay time control signal generator 110 generates a sawtooth-wave signal voltage as shown in FIG. 2.

The output of delay circuit 107 is fed to tuned amplifier 108, where another sine-wave signal voltage at the same frequency as the delayed synchronizing signal is generated. Tuned amplifier 108 can be operated at a center frequency in the range of 80 to 200 MHz, and the center frequency can be set equal to the frequency of dye laser oscillator 101.

The output of tuned amplifier 108 is amplified by a drive amplifier 109 and then fed to the pair of deflection electrodes 133 of the streaking tube 103.

A quasi-sine-wave signal voltage applied to the pair of deflection electrodes 133 swings from −575 volts into +575 volts. The peak-to-peak value of the quasi-sine-wave signal voltage measures 1150 volts. A voltage range of −100 volts to +100 volts in the above signal voltage waveform can only be used to effectively scan the electron beam which may arrive at phosphor layer 134.

The output of delay time control signal generator 110 is fed to the delay circuit 107 and also to the X-coordinate input terminal of an XY plotter 114 used as an output device.

A portion of the streaking image on the phosphor layer 134 can be formed on the photocathode of a photoelectron multiplier 112 through slit 111 arranged orthogonal to the time coordinate on phosphor layer 134 of the streaking tube 103 by the use of sampling means. The sampling means consist of lens 118 and slit 111. Slit 111 is arranged orthogonal to the time coordinate on phosphor layer 134 so that an image from phosphor layer 134 can be focused on the photocathode of photoelectron multiplier tube 112 through lens 118.

Photoelectron multiplier tube 112 converts into an electric signal the light beam passing through slit 111, and then it amplifies the obtained electric signal.

The output of photoelectron multiplier tube 112 is fed to the Y-coordinate input terminal of XY plotter 114 through amplifier 113.

The operation of the instrument built in accordance with the first embodiment of the present invention will be described with reference to the measured pulse signal waveforms due to fluorescence caused by a hematoporphyrin derivative stimulated by the laser beam.

Delay time control signal generator 110 starts operating at first. Delay time control signal generator 110 then generates a sawtooth-wave signal voltage with an amplitude of 10 V p-p at a frequency of 1 Hz.

Next, dye laser oscillator 101 starts operating. Dye laser oscillator 101 emits a laser pulse beam at a frequency of 100 MHz. The laser pulse beam is incident on hematoporphyrin derivative 104 through beam splitter 102 used as a semi-transparent mirror.

Hematoporphyrin derivative 104 is thus stimulated to emit light pulses. The light pulses emitted due to fluorescence are synchronized with the laser pulse beam.

The light pulses generated due to fluorescence are projected onto photocathode 131 of streaking tube 103 through an optical system consisting of lenses 116 and 117 and slit 115.

An image formed on photocathode 131 by the light pulses passing through slit 115 is linear because the width of slit 115 is extremely narrow.

Electrons emitted from photocathode 131, responding to the incident light forming the image, are accelerated by an electric field. The accelerated electron beam moves into phosphor layer 134 passing through a pair of deflection electrodes 133.

Part of the laser pulse beam branches into PIN photodiode 105 passing through beam splitter 102 and is then converted into a corresponding electric signal by PIN photodiode 105, and the obtained electric signal is fed to delay circuit 107 through amplifier 106.

The delay circuit 107 delays the input signal voltage by a fixed time "t" seconds when the control signal voltage is set at 0 volt, and by a fixed time "(t;30 3)" seconds when the control signal voltage is set at 10 volts.

The delay time increases in proportion to the control signal voltage, and is set within a range of 0 volt to 10 volts.

As described above, an input signal voltage synchronizing with the laser beam pulses clocked at 100 MHz (or in 10 ns intervals) is fed to delay circuit 107. The control signal voltage used to properly set the delay time is thus changed by an amount of 100 nV for a time interval of 10 ns between successive two input pulse voltages. It extends the delay time of the pulse signal voltage by an amount of $3 \times 10^{-17}$ second when the pulse signal voltage passes through variable delay circuit 107.

The control signal voltage change during the period between successive input pulse voltages is given by $$10 \text{ volts} \times 10 \text{ nano sec.}/1 \text{ sec} = 100 \text{ nano volts.}$$

The delay time change corresponding to the above control signal voltage change is given by $$3 \text{ nano sec.} \times 100 \text{ nano volts}/10 \text{ volts} = 3 \times 10^{-17} \text{ second.}$$

Hence, a pulse signal voltage fed to delay circuit 107 in 10 ns intervals is delayed by an amount of $3 \times 10^{-17}$ second.

A signal voltage delayed by delayed circuit 107 is fed to tuned amplifier 108 where the input signal voltage is converted into the corresponding sine-wave signal voltage, and then the output of tuned amplifier 108 is fed to drive amplifier 109 where a peak-to-peak voltage of 1150 volts swinging from −575 volts into +575 volts can be obtained. The output voltage of drive amplifier 109 is fed to the pair of deflection electrodes 133.

A voltage range of −100 volts to +100 volts fed from drive amplifier 109 can be used to sweep the electron beam.

The above operation delays the deflection field by an amount of $3 \times 10^{-17}$ second for each light pulse wile electrons are incident on the deflection field across a pair of deflection electrodes 133 every 10 nano seconds corresponding to the light pulses caused by fluorescence of hematoporphyrin derivative 104.

The streaking image on phosphor layer 134 will be discussed hereinafter in terms of the timing relation between electrons generated due to the fluorescence and the applied deflection field.

Figure 3:
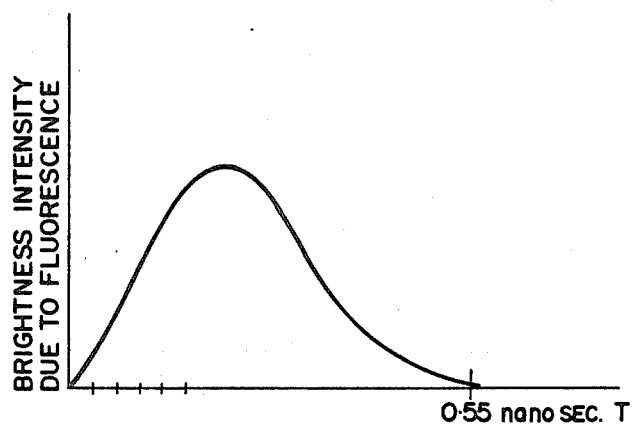
FIG. 3 shows a graph which depicts the profile of a train of light pulses due to fluorescence occurring in a hematoporphyrin derivative stimulated by a laser beam.

For ease of understanding, we assume that the profile of an arbitrary pulse among a train of pulses generated due to fluorescence obtained from hematoporphyrin derivative 104 is as shown in FIG. 3.

We also assume that the deflection field going from positive to negative directions is set at 0 V/m when the front portion of a group of electrons emitted responding to the first light pulse due to fluorescence passes across the deflection field. Under this assumption, an electric field across the pair of deflection electrodes 133 in FIG. 1 is defined as that with a positive polarity if the lines of force in the electric field go from the bottom to the top in the plane of the illustration, and that an electric field is defined as that with a negative polarity if the lines of force in the electric field go from the top to the bottom in the plane of the illustration.

Figure 4:
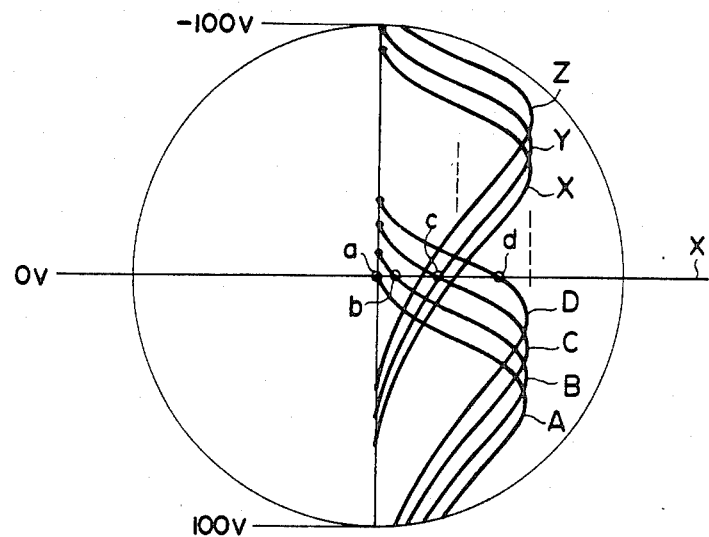
FIG. 4 shows a series of streaming images successively displaced with respect to each other in terms of the locations on the phosphor layer of the streaking tube.

The front porch of the grouped electrons is assumed to constitute a horizontal line on phosphor layer 134 at the center of streaking tube 103, and the horizontal line is designated as the X-coordinate in FIG. 4.

As the grouped electrons are advanced from the front to back porches, the horizontal line goes down from the X-coordinate in FIG. 4. Electrons delayed by 280 pico seconds from the front porch are deflected by a voltage of +100 volts, and then incident on an area at the bottom edge of phosphor layer 134. The series of streaking images obtained are shown at A in FIG. 4. The time coordinate of the curves shown at A agrees with that of the streaking image, and brightness is represented by the distance which is measured from the Y-coordinate.

Photoelectron multiplier 112, which can convert the light beam into the corresponding electric signal, is used to first multiply the light beam on the line indicated by X in FIG. 4 corresponding to slit 111 among the streaking images on phosphor layer 134 focused on the slit through lens 118. Electrons grouped corresponding to fluorescence which has occurred at the second time are applied to the deflection field in 10 nano seconds after fluorescence occurs at the first time. The deflection field occurring in the second period is delayed by (10 nano seconds+$3 \times 10^{-17}$ second) from the deflection field occurring in the first period.

Electrons grouped corresponding to fluorescence which has occurred at the second time is applied to the deflection field in $3 \times 10^{-17}$ second after those grouped at the first time, and thus the front porch of the grouped electrons is deflected by an amount which corresponds to about $-10$ $\mu$V. The streaking image caused by the fluorescence which has occurred at the second time is shown at B in FIG. 4. Photoelectron multiplier tube 112 can convert the signal portion in $3 \times 10^{-17}$ second after the front porch of the streaking image.

The deflection voltage currently applied to deflection electrodes 133 is delayed by $3 \times 10^{-17}$ second from that applied just before, and it appears at times equal to multiples of $3 \times 10^{-17}$ second after the electrons grouped corresponding to fluorescence occurring at the first time are applied to the deflection electrodes 133. The streaking images indicating a number of successive events which have occurred every $3 \times 10^{-17}$ second are thus formed on phosphor layer 134. Waveforms A, B, C ... X, Y and Z of FIG. 4 indicate these streaking images, where the pitches between the streaking images are exaggerated to make it easier for the reader to understand the events. A plurality of front porch portions delayed by multiples of $3 \times 10^{-17}$ second from the front porch of the first streaking image are converted into the corresponding electric signals with photoelectron multiplier tube 112. The output of photoelectron multiplier tube 112 is fed to the Y-coordinate input terminal of XY plotter 114 through amplifier 113.

Described hereinafter will be displaying of images on XY plotter 114 where the output of delay time control signal generator 110 and the output of photoelectron multiplier tube 112 can be input to the X- and Y-coordinate input terminals, respectively.

For ease of understanding the events, we assume that electrons grouped corresponding to fluorescence which has occurred at the first time are deflected if driven by the deflection voltage generated when the output of delay time control signal generator 110 is set at 0 volt. We designate as 0 second the time that the output of delay time control signal generator 110 is set at 0 volt.

Figure 5:
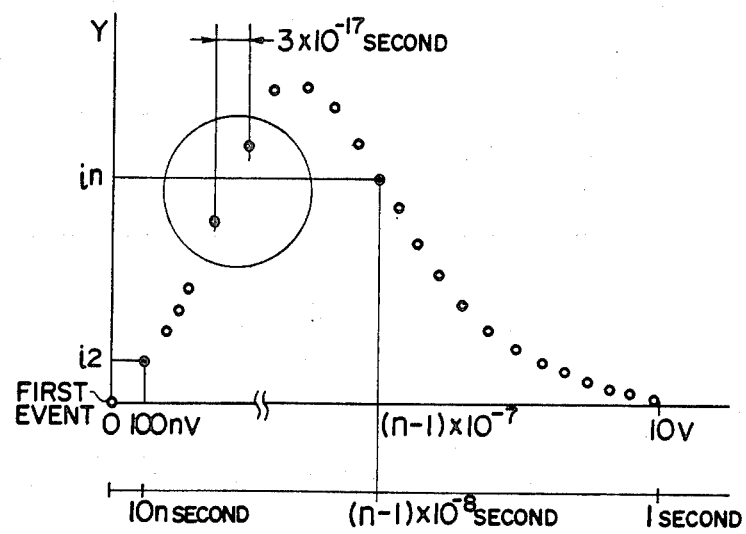
FIG. 5 shows the plotter output when the respective input signals are fed to the X and Y coordinates, respectively.

FIG. 5 shows the relationship between voltages at the X-coordinate input terminal of XY plotter 114 used as an output device and at the Y-coordinate input terminal thereof. The illustration in FIG. 5 indicates a graph on XY plotter 114. Values on the X-coordinate of XY plotter 114 are proportional to the input voltages, and the input voltages are proportional to the time elapsing from the reference point of time. An input voltage of 10 volts corresponds to a time of one second. Both the input voltage and time are given in the X-coordinate in FIG. 5.

Values on the Y-coordinate are proportional to the output current of photoelectron multiplier tube 112. A current which corresponds to the front porch of the streaking image caused by fluorescence which has occurred at the first time is applied to the Y-coordinate input terminal. We assume that the current is 0 ampere at present. The input voltage at the X-coordinate input terminal is 0 volt during this state. The point for X=0 and Y=0 corresponds to the origin in FIG. 5. The current which corresponds to the front porch of the streaking image caused by fluorescence which has occurred at the second time is applied to the Y-coordinate input terminal of XY plotter 114. We define this current as $i_2$. The input voltage applied to the X-coordinate input terminal at that time is 100 nano volts.

Intensity "$i_n$" of light caused by fluorescence which has occurred at the n-th time is delayed by an amount of $(n-1) \times 3 \times 10^{-17}$ second from the front porch of the streaking image. When "$i_n$" input at the Y-coordinate input terminal of XY plotter 114 is plotted in terms of "$(n-1) \times 100$ nano volts" at the X-coordinate input terminal thereof, the brightness intensity distribution starting with the front porch of the streaking image for a period of 3 nano seconds can be plotted by sampling data on the X-coordinate into $10^8$ points. The width of slit 111 is set at about 0.1 mm when the phosphor layer of the streaking tube has a diameter of about 30 mm, and thus the number of sampled points, which is set to be $10^8$, does not limit the modulation transfer function given by slit 111.

Next, the second embodiment of the present invention will be described after the principle of the second embodiment is described referring to FIGS. 6 through 8.

In some cases, an arbitrary wavelength component among a number of wavelength components contained in the light pulses to be measured by the instrument for measuring the light pulses clocked at a high repetition rate forms a pulse signal with the same waveform and clocked at an accurate interval. In the other cases, the emitted light with a directional pattern with its peak in a specific direction and with the light brightness intensity within an arbitrary solid angle is the same as that in the waveforms, and it forms a pulse signal clocked at an accurate repetition rate.

These types of light pulses can easily be measured in accordance with the second embodiment of the present invention.

First, the above modes of light emission will briefly be described.

Figure 6:
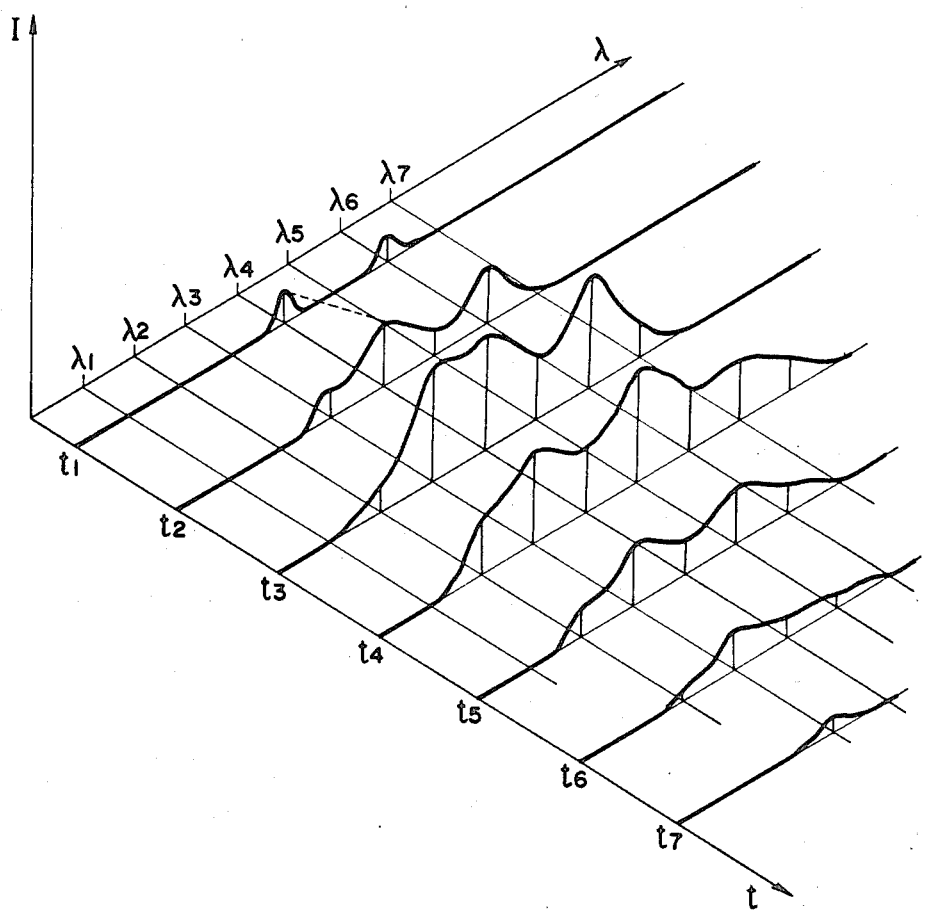
FIG. 6 shows changes in brightness intensity of a single light pulse among the multi-wavelength light pulses clocked at a high repetition rate.
Figure 7:
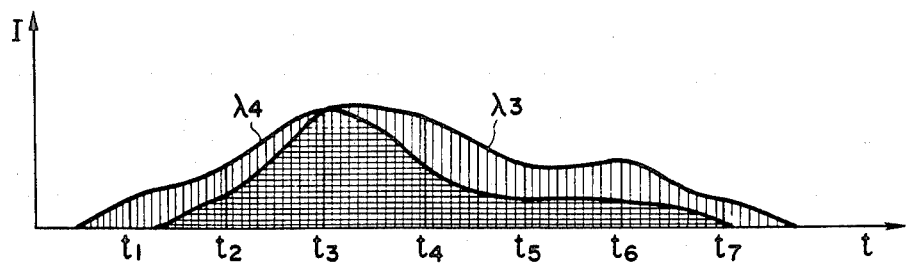
FIG. 7 shows the $\lambda_3$ and $\lambda_4$ wavelength components depicted in FIG. 6.

FIG. 6 shows changes in light intensity of a single light pulse contained in the multiple-wavelength light pulses clocked at a high repetition rate. In FIG. 6, the time coordinate is represented by t, the wavelength coordinate is represented by $\lambda$, and the light intensity coordinate is represented by I in a three-dimensional representation. FIG. 7 shows the $\lambda_3$ and $\lambda_4$ wavelength components depicted in FIG. 6. If the multiple-wavelength light pulses clocked at a high repetition rate are diminished, the measurement of an arbitrary wavelength component is not easy.

Figure 8:
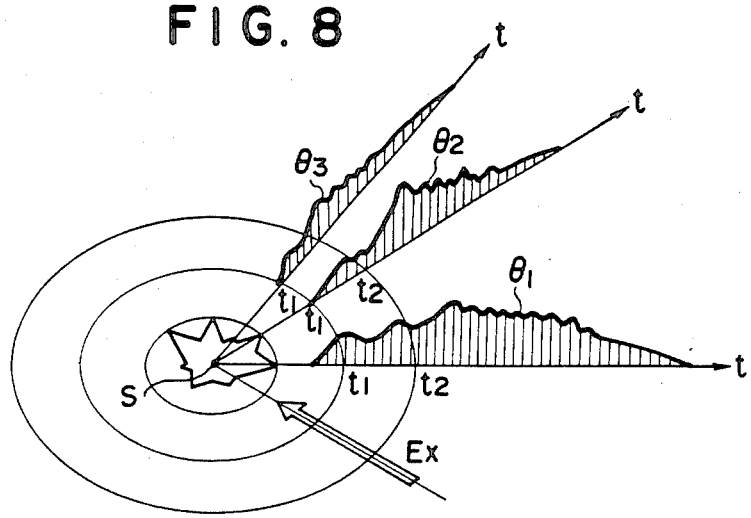
FIG. 8 shows an example of the directional pattern of the light beam to be measured.

The light pulses generated by a stimulus applied to a specific material due to the other light pulses clocked at a high repetition rate are characterized by the directional pattern shown in FIG. 8, and they depend on the physical structure of the material or the circumstance surrounding the material.

Separation of arbitrary information in a time or space domain from the light signals generated at the same time is keenly desired.

The light pulses due to fluorescence obtained by stimulating the hematoporphyrin derivative absorbed in a cancerous organ from the output of the dye laser oscillator emitting at approximately 405 nanometers have peaks at both 630 nanometers and 690 nanometers.

If the results obtained by responses at 630 nanometers and 690 nanometers are separately analyzed, accuracy of the diagnosis of cancers will be improved.

Figure 9:
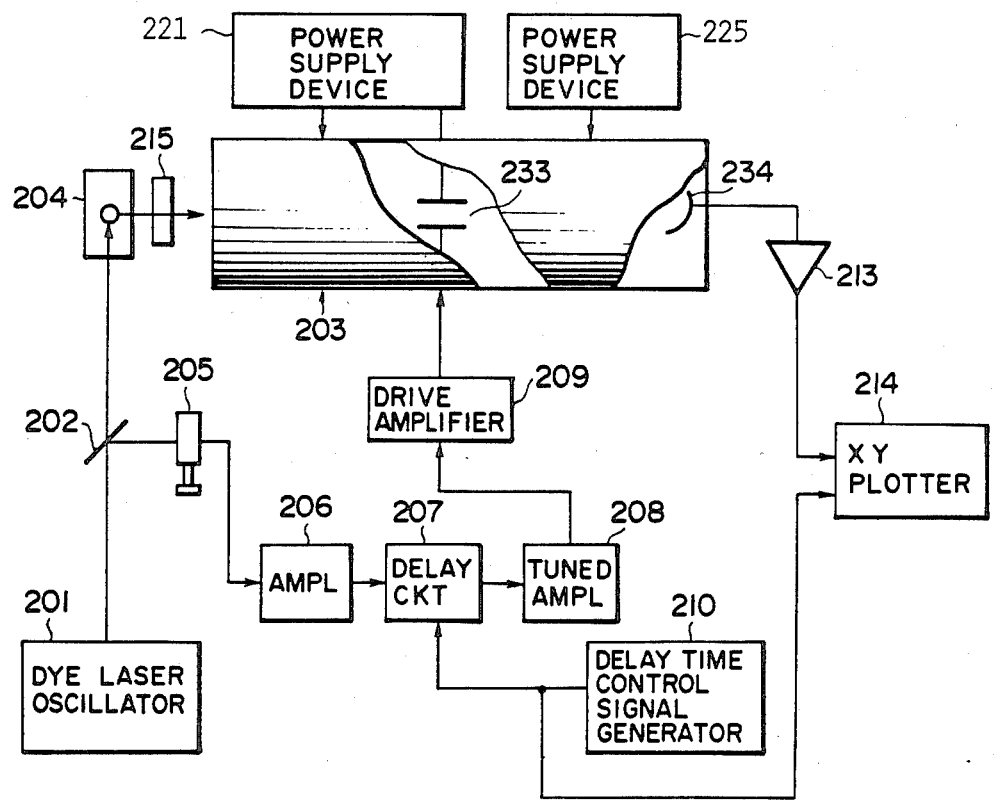
FIG. 9 shows a block diagram of the second embodiment of the instrument for measuring the light pulses clocked at a high repetition rate in accordance with the present invention.

FIG. 9 shows a block diagram of the instrument for analyzing an arbitrarily selected portion of the spectrum distribution formed by the streaking image of light pulses clocked at a high repetition rate in accordance with the second embodiment of the present invention.

The instrument built in accordance with the second embodiment of the present invention is used to observe an arbitrarily selected portion of the spectrum distribution formed by the streaking image with a diminished intensity of light due to fluorescence of a hematoporphyrin derivative so as to specify the hematoporphyrin derivative recognized as an organic molecular crystal being used to diagnose and cure cancer.

The structure of the streaking tube used as a main part of the streaking camera will be described hereinafter, the numbers designating the components thereof corresponding to those of FIG. 1 except that the first digit is a "2" rather than "1."

Photocathode 231 is formed on the inner wall of the incident plane within the vacuum envelope of streaking tube 203, and phosphor layer 234 is formed on the opposite inner wall thereof.

Mesh electrode 235, focusing electrode 236, aperture electrode 237, a pair of deflection electrodes 233 and micro-channel-plate 232 are sequentially arranged in a space between photocathode 231 and phosphor layer 234.

Micro-channel-plate 232 is installed in a frame having an outer diameter of 32.7 mm and an inner diameter of 27 mm, and it consists of a plurality of channels or secondary electron multipliers arranged in parallel. Each channel has an inner diameter of 25 $\mu$m, and channels are arranged in 32 $\mu$m spans between adjacent channel centers. The length of each channel is 50 times the inner diameter thereof.

The input electrode lead of micro-channel-plate 232 is grounded and a voltage of 900 volts is applied to the output electrode lead thereof. When an electron is incident on the input electrode of micro-channel-plate 232, electrons of the order of $10^3$ are generated from the output electrode thereof.

The input electrode lead of micro-channel-plate 232 and aperture electrode 237 are grounded. A DC voltage of $-4000$ volts is applied to photocathode 231 from power supply 221. A DC voltage of $-300$ volts to mesh electrode 235 and a DC voltage of $-3100$ volts to focusing electrode 236 are fed through a dividing network consisting of resistors 222, 223 and 224 from power supply 221. A DC voltage greater than the DC potential on the output electrode of micro-channel-plate 232 by 3000 volts is applied to phosphor layer 234 from power supply 225. A DC voltage of 1500 volts is applied to the output electrode of micro-channel-plate 232.

The laser pulse beam issued from dye laser oscillator 201 is incident on hematoporphyrin derivative 204 which can emit the light pulses to the photocathode 231.

Dye laser oscillator 201 can emit the 600 nm light pulses with a pulse width of 1 ps clocked at a repetition rate in the range of 80 to 200 MHz. Dye laser oscillator 201 repetitively issues the stimulating signal at the intervals to the object to be measured by the instrument built in accordance with the present invention, and it constitutes a stimulating signal source which causes fluorescence to occur in response to the stimulating signal.

Beam splitter 202 consisting of a semi-transparent mirror causes the light pulses from the dye laser oscillator to branch into hematoporphyrin derivative 204 and PIN diode 205. In other words, part of the laser pulse beam strikes hematoporphyrin derivative 204 to be measured.

Hematoporphyrin derivative 204 can emit light pulses due to fluorescence which occurs in synchronization with the laser pulse beam.

Light pulses due to the fluorescence can be input to phosphor layer 231 of streaking tube 203 through optical means through which the light pulses can pass in the streaking camera. The optical means consists of spectroscope 220, slit 215, and lenses 216 and 217. Slit 215 is arranged perpendicular to the plane of the illustration, and it directs to the stripe for representing the spectral response obtained by spectroscope 220. FIG. 10 shows a planar view illustrating the spatial relationship between hematoporphyrin derivative 204 and spectroscope 220. Light pulses caused by fluorescence from hematoporphyrin derivative 204 are projected onto a certain location on phosphor layer 231 by the optical means so that a narrow-width stripe may be formed in the direction in which streaking tube 203 is scanned. The other portion of the laser pulse beam is incident on PIN photodiode 205.

PIN photodiode 205 is a photoelectric device with a very fast response time, and it can generate pulse currents responding to the incident laser pulse beam. The output of PIN photodiode 205 is amplified by amplifier 206, and thus a synchronizing signal is formed. The output terminal of amplifier 206 is connected to delay circuit 207.

Delay circuit 207 is used to delay the synchronizing signal by an appropriate amount of time in accordance with the timing signal issued from delay time control signal generator 210.

The sweeping voltage applied to a pair of deflection electrodes 233 when photoelectrons from photocathode 231 pass through the deflection electrodes 233 is delayed in phase, and thus it is synchronized with the delayed synchronizing signal. Delay time control signal generator 210 generates a sawtooth-wave signal voltage as shown in FIG. 2.

The output of delay circuit 207 is fed to tuned amplifier 208, where another sine-wave signal voltage at the same frequency as the delayed synchronizing signal is generated. Tuned amplifier 208 can be operated at a center frequency in the range of 80 to 200 MHz, and the center frequency can be set equal to the frequency of dye laser oscillator 201.

The output of tuned amplifier 208 is amplified by drive amplifier 209 and then fed to the pair of deflection electrodes 233 of the streaking tube 203.

A quasi-sine-wave signal voltage applied to the pair of deflection electrodes 233 swings from $-575$ volts into $+575$ volts. The peak-to-peak value of the quasi-sine wave signal voltage measures 1150 volts. A voltage range of $-100$ volts to $+100$ volts in the above signal voltage waveform can only be used to effectively scan the electron beam which may arrive at phosphor layer 234.

The output of delay time control signal generator 210 is fed to the delay circuit 207 and also to the X-coordinate input terminal of XY plotter 214 used as an output device.

An arbitrary portion perpendicular to the streaking image on the photocathode orthogonal to the time coordinate on phosphor layer 234 of the streaking tube 203 can be formed on the photocathode of the photoelectron multiplier by the use of sampling means. The sampling means consists of lens 218 and partial pick-up plate 211. FIG. 11 shows an expanded view of a preferred embodiment of the partial pick-up plate contained in the sampling means.

Slit 211c of partial pick-up plate 211 is a vertical stripe arranged in such a direction that the streaking image is scanned in the time coordinate on phosphor layer 234, and it is formed on a plane where an image is projected on phosphor layer 234 through focusing lens 218.

Groove 211f is formed in parallel with slit 211c above the slit 211c, movable portion 211b with opening 211d is supported in such a manner that movable portion 211b supported at portion 211e can be moved along groove 211f. Photoelectron multiplier tube 212, which can convert light signals into the corresponding electric signal, is used to multiply a portion of the light beam which cannot be limited by both movable portion 211b and slit 211c of partial pick-up plate 211.

The output signal of photoelectron multiplier tube 212 is fed to the Y-coordinate input terminal of XY plotter 214 through amplifier 213.

The operation of the instrument built in accordance with the second embodiment of the present invention will be described referring to the measured pulse signal waveforms due to fluorescence caused by a hematoporphyrin derivative stimulated by the laser beam.

Delay time control signal generator 210 starts operating at first. Delay time control signal generator 210 then generates a sawtooth-wave signal voltage with an amplitude of 10 V p-p at a frequency of 1 Hz.

Next, dye laser oscillator 201 starts operating. Dye layer oscillator 201 emits a laser pulse beam at a frequency of 100 MHz. The laser pulse beam is incident on hematoporphyrin derivative 204 through beam splitter 202 used as a semi-transparent mirror.

Hematoporphyrin derivative 204 is thus stimulated to emit the light pulses. The light pulses emitted due to fluorescence are synchronized with the laser pulse beam.

The light pulses generated due to fluorescence are projected onto photocathode 231 of streaking tube 203 through an optical system consisting of spectroscope 220, lenses 216 and 217 and slit 215.

An image formed on photocathode 231 by the light pulses passing through slit 215 is linear because the width of slit 215 is extremely narrow. The spectral response obtained by fluorescence is thus arranged in a line.

Electrons emitted from photocathode 231, responding to the incident light of image, are accelerated by an electric field. The accelerated electron beam moves into phosphor layer 234 passing through a pair of deflection electrodes 233.

Part of the laser pulse beam branches into PIN photodiode 205 passing through beam splitter 202 and then it is converted into the corresponding electric signal by PIN photodiode 205, and the obtained electric signal is fed to delay circuit 207 through amplifier 206.

The delay circuit 207 delays the input signal voltage by fixed time "t" seconds when the control signal voltage is set at 0 volt, and by fixed time "(t+3)" seconds when the control signal voltage is set at 10 volts.

The delay time increases in proportion to the control signal voltage if the control signal voltage is set within a range of 0 volt to 10 volts.

As described above, an input signal voltage synchronizing with the laser beam pulses clocked at 100 MHz (or in 10 ns intervals) is fed to the delay circuit. The control signal voltage used to properly set the delay time is thus changed by an amount of 100 nV or a time interval of 10 ns between successive two input pulse voltages. It elongates the delay time of the pulse signal voltage by an amount of $3 \times 10^{-17}$ second when the pulse signal voltage passes through variable delay circuit 207.

The control signal voltage change during the period between successive input pulse voltages is given by 10 volts × 10 nano sec./1 sec. = 100 nano volts.

The delay time change corresponding to the above control signal voltage change is given by 3 nano sec. × 100 nano volts/10 volts = $3 \times 10^{-17}$ second.

Hence, a pulse signal voltage fed to delay circuit 207 in 10 ns intervals is delayed by an amount of $3 \times 10^{-17}$ second.

The signal voltage delayed by delay circuit 207 is fed to tuned amplifier 208 where the input signal voltage is converted into the corresponding sine-wave signal voltage, and then the output of tuned amplifier 208 is fed to drive amplifier 209 where a peak-to-peak voltage of 1150 volts swinging from −575 volts into +575 volts can be obtained. The output voltage of drive amplifier 209 is fed to the pair of deflection electrodes 233.

A voltage range of −100 volts to +100 volts fed from drive amplifier 209 can be used to sweep the electron beam.

The above operation delays the deflection field by an amount of $3 \times 10^{-17}$ second for each light pulse while electrons are incident on the deflection field across the pair of deflection electrodes 233 every 10 nano seconds corresponding to the light pulses caused by fluorescence of hematoporphyrin derivative 204.

The streaking image on phosphor layer 234 will be discussed hereinafter in terms of the timing relation between electrons generated due to the fluorescence and the applied deflection field.

For ease of understanding, we assume that the profile of an arbitrary pulse among a train of pulses generated due to fluorescence obtained from hematoporphyrin derivative 204 is as shown in FIG. 3. This signal waveform corresponds to that shown in FIG. 7.

We also assume that the deflection field going from positive to negative directions is set a 0 V/m when the front portion of a group of electrons emitted responding to the spectral response which corresponds to the first light pulse due to fluorescence passes across the deflection field. With this assumption, the electric field across the pair of deflection electrodes 233 in FIG. 9 is defined as that with positive polarity if the lines of force in the electric field go from the bottom to top in the plane of the illustration, and that an electric field is defined as that with negative polarity if the lines of force in the electric field go from the top to bottom in the plane of the illustration.

The front porch of the grouped electrons is assumed to constitute a horizontal line on phosphor layer 234 at the center of streaking tube 203, and the horizontal line is designated as the X-coordinate in FIG. 4.

As the grouped electrons are advanced from the front to back porches, the horizontal line goes down from the X-coordinate in FIG. 4. Electrons delayed by 280 pico seconds from the front porch are deflected by a voltage of +100 volts, and then incident on an area at the bottom edge of phosphor layer 234. A series of streaking images obtained are shown at A in FIG. 4. The time coordinate of the curves shown at A agrees with that of the streaking image, and brightness intensity is represented by the distance which is measured from the line on the Y-coordinate.

Photoelectron multiplier tube 212, which can convert the light beam into a corresponding electric signal, is used to multiply a portion of the light beam picked up through opening 211d of the movable plate 211b on the line indicated by X in FIG. 4 among the streaking images projected onto partial pick-up plate 211 from phosphor layer 234.

The location of opening 211d, for instance, corresponds to that assigned to 630 or 690 nm, and it can arbitrarily be specified by the operator of the measuring instrument.

Electrons grouped corresponding to fluorescence which has occurred at the second time are applied to the deflection field in 10 nano seconds after fluorescence occurs at the first time. The deflection field occurring in the second period is delayed by (10 nano seconds + $3 \times 10^{-17}$ second) from the deflection field occurring in the first period.

Electrons grouped corresponding to fluorescence which has occurred at the second time are applied to the deflection field in $3 \times 10^{-17}$ second after those grouped at the first time, and thus the front porch of the grouped electrons is deflected by an amount which corresponds to about −10 μV. The streaking image caused by the fluorescence which has occurred at the second time is shown at B in FIG. 4. Photoelectron multiplier tube 212 can convert the signal portion in $3 \times 10^{-17}$ second after the front porch of the streaking image.

The deflection voltage currently applied to deflection electrodes 233 is delayed by $3 \times 10^{-17}$ second from that applied just before, and it appears at times equal to multiples of $3 \times 10^{-17}$ second after the electrons grouped corresponding to fluorescence occurring at the first time are applied to the deflection electrodes 233. The streaking images indicating a number of successive events which have occurred every $3 \times 10^{-17}$ second are thus formed on phosphor layer 234. Waveforms A, B, C ... X, Y and Z of FIG. 4 indicate these streaking images, where the pitches between streaking images are exaggerated to make it easier for the reader to understand the events. A plurality of front porch portions delayed by multiples of $3 \times 10^{-17}$ second from the front porch of the first streaking image are converted into the corresponding electric signals with photoelectron multiplier tube 212. The output of photoelectron multiplier tube 212 is fed to the Y-coordinate input terminal of XY plotter 214 through amplifier 213.

Described hereinafter will be displaying of images on XY plotter 214 where the output of delay time control signal generator 210 and the output of photoelectron multiplier tube 212 can be input to the X- and Y- coordinate input terminals, respectively.

For ease of understanding the events, we assume that electrons grouped corresponding to fluorescence which has occurred at the first time are deflected if driven by the deflection voltage generated when the output of delay time control signal generator 210 is set at 0 volt. We designate as 0 second the time that the output of delay time control signal generator 210 is set at 0 volt.

FIG. 5 shows a relationship between voltages at the X-coordinate input terminal of XY plotter 214 used as an output device and at the Y-coordinate input terminal thereof. The illustration in FIG. 5 indicates a graph on XY plotter 214. Values on the X-coordinate of XY plotter 214 are proportional to the input voltages, and the input voltages are proportional to the time elapsing from the reference point of time. An input voltage of 10 volts corresponds to a time of one second. Both the input voltage and time are given in the X-coordinate in FIG. 5.

Values on the Y-coordinate are proportional to the output current of photoelectron multiplier tube 212. A current which corresponds to the front porch of the streaking image caused by fluorescence which has occurred at the first time is applied to the Y-coordinate input terminal. We assume that the current is 0 ampere at present. The input voltage at the X-coordinate input terminal is 0 volt during this state. The point for X=0 and Y=0 corresponds to the origin in FIG. 5. The current which corresponds to the front porch of the streaking image caused by fluorescence which has occurred at the second time is applied to the Y-coordinate input terminal of XY plotter 214. We define this current as $i_2$. The input voltage applied to the X-coordinate input terminal at that time is 100 nano volts.

Intensity "$I_n$" of light caused by fluorescence which has occurred at the n-th time is delayed by an amount of $(n-1)\times 3\times 10^{-17}$ second from the front porch of the streaking image. When "$i_n$" input at the Y-coordinate input terminal of XY plotter 214 is plotted in terms of "$(n-1)\times 100$ nano volts" at the X-coordinate input terminal thereof, the brightness intensity distribution starting with the front porch of the streaking image for a period of 3 nano seconds can be plotted by sampling data on the X-coordinate into $10^8$ points. The width of slit 211 is set at about 0.1 mm when the phosphor layer of the streaking tube has a diameter of about 30 mm, and thus the number of sampled points, which is set to be $10^8$, does not limit the modulation transfer function given by slit 211.

FIG. 12 is a perspective view showing an embodiment of the streaking tube and optical means in the second embodiment of the instrument for measuring the light pulses.

One end of the light guide is located at a certain angle around light emitting source S excited from the direction of Ex, and the other end faces the photocathode of streaking tube 203.

In the configuration shown in FIG. 12, the brightness intensity of light due to fluorescence can be measured when an appropriate portion of the image on the phosphor layer of streaking tube 203 is picked up by means of the sampling means. When an image of the light beam to be measured by the optical system where spectroscope 220 has been eliminated from FIG. 9 without the use of the specific optical means is formed on the photocathode of streaking tube 203 so that the image of the light beam is linear in shape, the brightness intensity distribution over the straight line of the optical linear image changes from one place to another. This causes the streaking image perpendicular to the time coordinate on the phosphor layer to change in brightness intensity distributed thereon.

A portion of the streaking image where the brightness intensity is extraordinarily high, if confirmed, can be picked up by the sampling means.

The third embodiment of the present invention will now be described.

Figure 13:
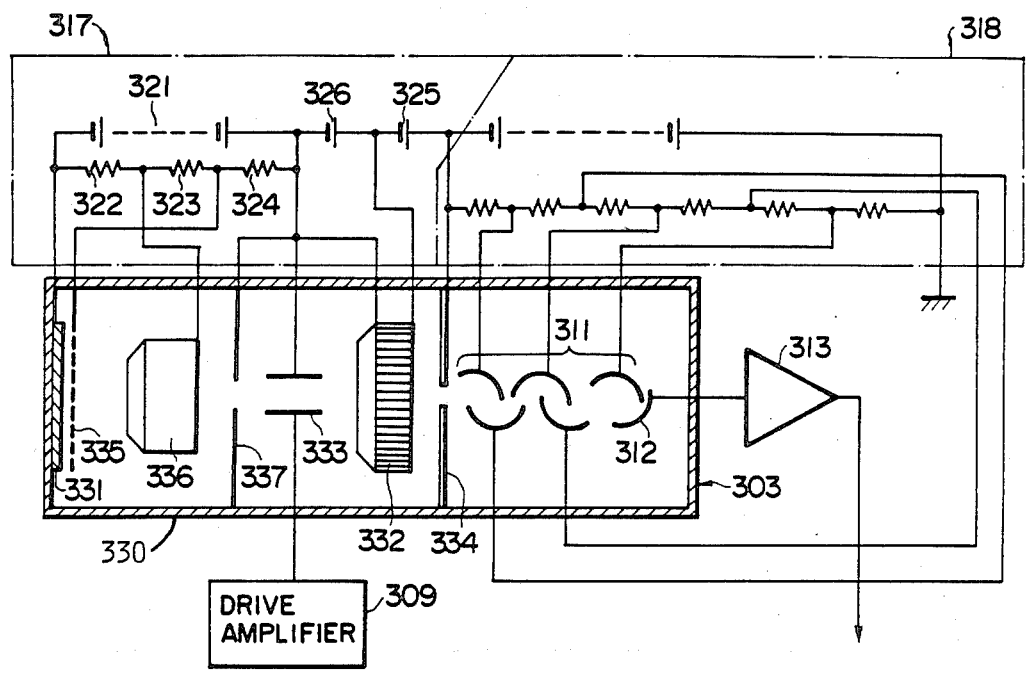
FIG. 13 shows a cross-sectional view and connections of an electron tube device for measuring the light pulses clocked at a high repetition rate in accordance with the present invention.
Figure 14:
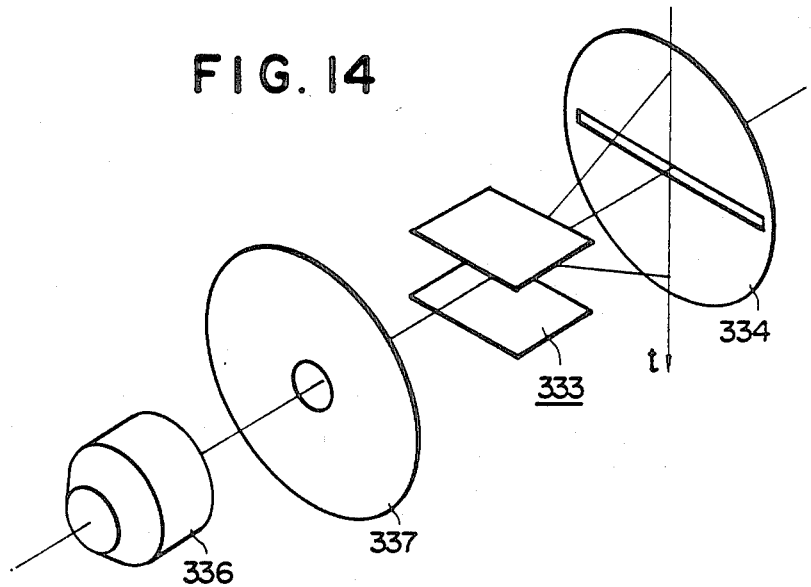
FIG. 14 shows an expanded perspective view of the focusing electrode, aperture electrode, deflection electrode, and slit electrode of the electron tube.

FIG. 13 shows a cross-sectional view and interconnection of the electron tube in an electron tube device for measuring light pulses clocked at a high repetition rate in accordance with the third embodiment of the present invention. FIG. 14 shows an expanded view of the focusing electrode, aperture electrode, deflection electrodes and slit electrode of the electron tube.

Photocathode 331 is formed on the inner wall of the incident plane within vacuum envelope 330 of electron tube 303. Mesh electrode 335, focusing electrode 336, aperture electrode 337, a pair of deflection electrodes 333, and micro-channel-plate 332 are sequentially arranged in the inner side of photocathode 331.

Micro-channel-plate 332 is installed in a frame having an outer diameter of 32.7 mm and an inner diameter of 27 mm, and it consists of a plurality of channels or secondary electron multipliers arranged in parallel. Each channel has an inner diameter of 25 μm, and channels are arranged in 32 μm spans between adjacent channel centers. The length of each channel is 50 times the inner diameter thereof.

The input electrode lead of micro-channel-plate 332 is grounded and a voltage of 900 volts is applied to the output electrode lead thereof. When an electron is incident on the input electrode of micro-channel-plate 332, electrons of the order of $10^3$ are generated from the output electrode thereof.

The input electrode lead of micro-channel-plate 332 and aperture electrode 337 are grounded. A DC voltage of −4000 volts is applied to photocathode 331 from power supply 321. A DC voltage of −300 volts to mesh electrode 335 and a DC voltage of −3100 volts to focusing electrode 336 are fed through a dividing network consisting of resistors 322, 323 and 324 from power supply 321. A DC voltage greater than the DC potential on the output electrode of micro-channel-plate 332 by 3000 volts is applied to slit electrode 334 from power supply 325. A DC voltage of 1500 volts is applied to the output electrode of micro-channel-plate 332.

The slit installed in slit electrode 334 is perpendicular to the direction of deflection which is carried out within a pair of deflection electrodes 333. (See FIG. 14.)

The slit electrode 334 is, for instance, made of stainless steel which has relatively lower secondary electron emission coefficient, or it is made of a metal with a titanium overcoat formed by plating or cladding to decrease the secondary electron emission coefficient.

A distribution of electrons corresponding to the spectrum of the light pulses, which appears orthogonal to the slit, is formed by displacing a streaking image from the adjacent one in order when it appears at the slit electrode 334. Electrons distributed corresponding to the slit, which are selected from the electrons distributed to form the streaking images, are amplified by dynode 311 passing through slit electrode 334, and they are output at collecting electrode 312.

An example of a device or measuring the light pulses generated due to fluorescence which occurs when the light pulses from dye laser oscillator 301 are incident on hematoprophyrin derivative 304, which is realized by operating the electron tube device, will be described hereinafter in detail.

Figure 16:
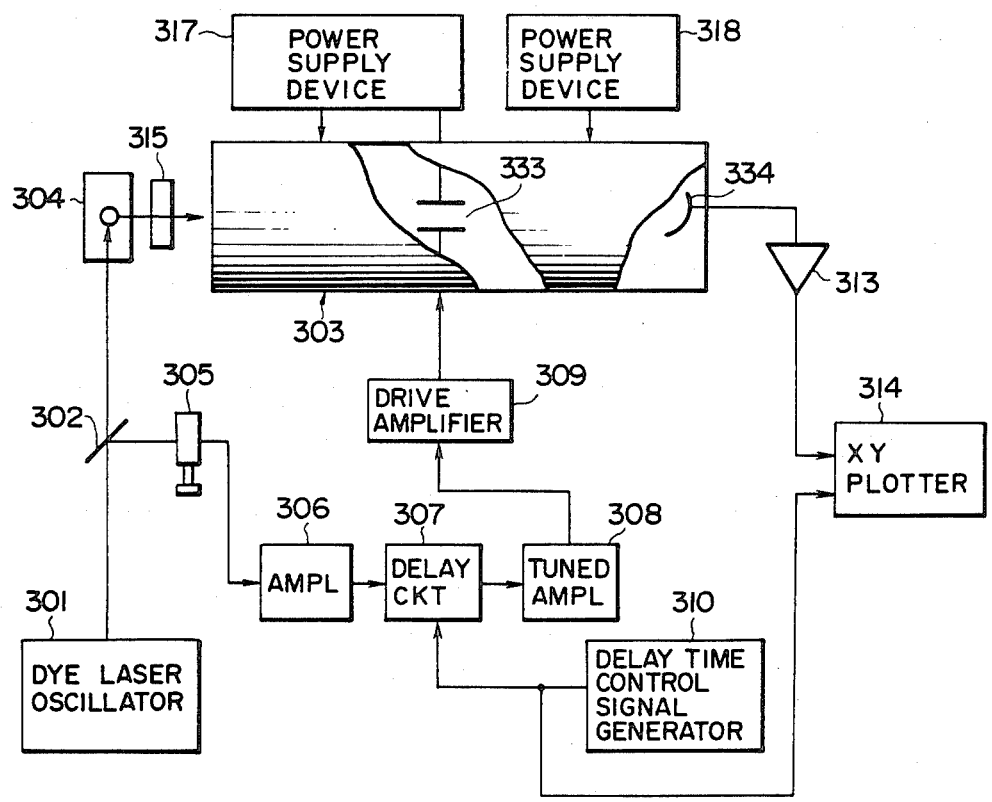
FIG. 16 shows a block diagram of a further embodiment of the instrument for measuring light pulses clocked at a high repetition rate, which was made by using the first electron tube device for measuring light pulses clocked at a high repetition rate.

FIG. 16 is a block diagram showing an embodiment of the device for measuring light pulses clocked at a high repetition rate by using the electron tube device.

Dye laser oscillator 301 can emit 600 nm light pulses with a pulse width of 1 ps clocked at a repetition rate in the range of 80 to 200 MHz.

The output of dye laser oscillator 301 branches into two routes by means of semi-transparent mirror 302. One of these routes leads to the object which can be measured by the electron tube device of this embodiment, and it constitutes a stimulating signal source which causes fluorescence to occur in response to the stimulating signal. The other route constitutes a synchronizing signal source to generate the deflection electric field synchronizing with the light pulses occurring due to the fluorescence.

Hematoporphyrin derivative 304 can emit light pulses due to fluorescence in synchronization with the laser pulse beam.

Light pulses due to the fluorescence can be input to photocathode 331 of electron tube 303 through optical means 315 through which the light pulses can pass. The light pulses due to fluorescence occurring in hematoporphyrn derivative 304 are projected onto a certain location on photocathode 331 by means of the optical means 315 so that a very narrow-width stripe of light image can be formed.

The other light beam which branches into the second route from the pulse laser through the semi-transparent mirror 302 is incident on PIN photodiode 305.

PIN photodiode 305 is a photoelectric device with a very fast response time, and it can generate pulse currents responding to the incident laser pulse beam. The output of PIN photodiode 305 is amplified by amplifier 306, and thus a synchronizing signal is formed. The output terminal of amplifier 306 is connected to delay circuit 307.

Delay circuit 307 is used to delay the synchronizing signal by an appropriate amount of time in accordance with the timing signal issued from delay time control signal generator 310.

The sweeping voltage applied to a pair of deflection electrodes 333 when photoelectrons from photocathode 331 pass through the deflection electrodes 333 is delayed in phase, and thus it is synchronized with the delayed synchronizing signal. Delay time control signal generator 310 generates a sawtooth-wave signal voltage as shown in FIG. 2.

The output of delay circuit 307 is fed to tuned amplifier 308, where another sine-wave signal voltage at the same frequency as the delayed synchronizing signal is generated. Tuned amplifier 308 can be operated at a center frequency in the range of 80 to 200 MHz, and the center frequency can be set equal to the frequency of dye laser oscillator 301.

Outputs of tuned amplifier 308 are amplified with drive amplifier 309 and then fed to a pair of deflection electrodes 333 of the electron tube 303.

A quasi-sine-wave signal voltage applied to a pair of deflection electrodes 333 swings from $-575$ volts into $+575$ volts. The peak-to-peak value of the quasi-sine-wave signal voltage measures 1150 volts. A voltage range of $-100$ volts to $+100$ volts in the above signal voltage waveform can only be used to effectively scan the electron beam.

The output of delay time control signal generator 310 is fed to the delay circuit 307 and also to the X-coordinate input terminal of XY plotter 314 used as an output device.

A portion of the electronic image formed in the direction perpendicular to the slit of the slit electrode of the electron tube 303, which corresponds to the slit, is amplified with amplifier 313 and then it is fed to the Y-axis coordinate input terminal of XY plotter 314.

Operation of the instrument for measuring the light pulses due to the fluorescence will be described hereinafter.

Delay time control signal generator 310 starts operating at first. Delay time control signal generator 310 then generates a sawtooth-wave signal voltage with an amplitude of 10 V p-p at a frequency of 1 Hz.

Next, dye laser oscillator 301 starts operating. Dye laser oscillator emits a laser pulse beam at a frequency of 100 MHz. The laser pulse beam is incident on hematoporphyrin derivative 304 through beam splitter 302 used as a semi-transparent mirror.

Hematoporphyrin derivative 304 is thus stimulated to emit the light pulses. The light pulses emitted due to fluorescence are synchronized with the laser pulse beam.

The light pulses generated due to fluorescence are projected onto photocathode 331 of electron tube 303 through an optical system 315.

Electrons emitted from photocathode 331, responding to the incident light forming the image, are accelerated by an electric field. The accelerated electron beam moves into phosphor layer 334 passing through a pair of deflection electrodes 333.

Part of the laser pulse beam branches into PIN photodiode 305 passing through semi-transparent mirror 302 and is then converted into the corresponding electric signal by PIN photodiode 305, and the obtained electric signal is fed to delay circuit 307 through amplifier 306.

The delay circuit 307 delays the input signal voltage by fixed time "t" seconds when the control signal voltage is set at 0 volt, and by fixed time "(t+3)" seconds when the control signal voltage is set at 10 volts.

The delay time increases in proportion to the control signal voltage if the control signal voltage is set within a range of 0 volt to 10 volts.

As described above, an input signal voltage synchronizing with the laser beam pulses clocked at 100 MHz (or in 10 ns intervals) is fed to delay circuit 307. The control signal voltage used to properly set the delay time is thus changed by an amount of 100 nV for a time interval of 10 ns between successive two input pulse voltages. It elongates the delay time of the pulse signal voltage by an amount of $3\times10^{-17}$ second when the pulse signal voltage passes through variable delay circuit 307.

The control signal voltage change during the period between successive input pulse voltages is given by $$10 \text{ volts} \times 10 \text{ nano sec.}/1 \text{ sec} = 100 \text{ nano volts.}$$

The delay time change corresponding to the above control signal voltage change is given by $$3 \text{ nano sec.} \times 100 \text{ nano volts}/10 \text{ volts} = 3\times10^{-17} \text{ second.}$$

Hence, a pulse signal voltage fed to delay circuit 307 in 10 ns intervals is delayed by an amount of $3\times10^{-17}$ second.

A signal voltage delayed by delay circuit 307 is fed to tuned amplifier 308 where the input signal voltage is converted into the corresponding sine-wave signal voltage, and then the output of tuned amplifier 308 is fed to drive amplifier 309 where a peak-to-peak voltage of 1150 volts swinging from $-575$ volts into $+575$ volts can be obtained. The output voltage of drive amplifier 309 is fed to a pair of deflection electrodes 333.

A voltage range of $-100$ volts to $+100$ volts fed from drive amplifier 309 can be used to sweep the electron beam.

The above operation delays the deflection field by an amount of $3\times10^{-17}$ second for each light pulse while electrons are incident on the deflection field across a pair of deflection electrodes 333 every 10 nano seconds corresponding to the light pulses caused by fluorescence of hematoporphyrin derivative 304.

The electronic image produced on slit plate 334 will be discussed hereinafter referring to the electrons and electric deflection field represented in terms of the time that the light pulses are generated due to the fluorescence to be measured.

For ease of understanding, we assume that the profile of an arbitrary pulse among a train of pulses generated due to fluorescence obtained from hematoporphyrin derivative 304 is as shown in FIG. 3.

We also assume that the deflection field going from positive to negative directions is set at 0 V/m when the front portion of a group of electrons emitted responding to the first light pulse due to fluorescence passes across the deflection field. In this assumption, an electric field across the pair of deflection electrodes 333 in FIG. 13 is defined as that with a positive polarity if the lines of force in the electric field go from the bottom to top in the plane of the illustration, and that an electric field is defined as that with a negative polarity if the lines of force in the electric field go from the top to bottom in the plane of the illustration.

The front porch of the grouped electrons is assumed to constitute a horizontal line on phosphor layer 334 at the center of electron tube 303.

The front porch of the grouped electrons strikes the center of electron tube 303. In other words, the grouped electrons are incident on the horizontal line which extends passing through the center of the slit of slit electrode 334.

As the grouped electrons are advanced from the front to back porches, the horizontal line goes down from the X-coordinate in FIG. 4. Electrons delayed by 280 pico seconds from the front porch are deflected by a voltage of +100 volts, and then incident on an area at the bottom edge of phosphor layer 334. A series of streaking images obtained are shown at A in FIG. 4. The time coordinate of the curves shown at A in FIG. 4 agrees with that of the streaking image, and the brightness intensity is represented by the distance which is measured from the Y-coordinate.

Electrons at portion a on the distribution of electrons in FIG. 4 are multipled by dynode 311 in FIG. 13, passing through the slit, and then collected at collecting electrode 312. These electronic signals are amplified by amplifier 313. Electrons grouped corresponding to fluorescence which has occurred at the second time are applied to the deflection field in 10 nano seconds after fluorescence occurs at the first time. The deflection field occurring in the second period is delayed by (10 nano seconds + $3 \times 10^{-17}$ second) from the deflection field occurring in the first period.

Electrons grouped corresponding to fluorescence which has occurred at the second time is applied to the deflection field in $3 \times 10^{-17}$ second after those grouped at the first time, and thus the front porch of the grouped electrons is deflected by an amount which corresponds to about $-10$ $\mu V$. The distribution of electrons caused by the fluorescence which has occurred at the second time is shown at B in FIG. 4.

Electrons on a portion, indicated by b in FIG. 4, delayed by $3 \times 10^{-17}$ sec. from the front porch of the grouped electrons are multiplied with dynode 311 in FIG. 13 and then collected at collecting electrode 312. The obtained electronic signals are amplified by amplifier 313.

The deflection voltage currently applied to deflection electrodes 333 is delayed by $3 \times 10^{-17}$ second from that applied just before, and it appears at times equal to multiples of $3 \times 10^{-17}$ second after the electrons grouped corresponding to fluorescence occurring at the first time are applied to the deflection electrodes 333. The streaking images indicating a number of successive events which have occurred every $3 \times 10^{-17}$ second are thus formed on the slit. Waveforms A, B, C ... X, Y and Z of FIG. 4 indicate the images of grouped electrons, where the pitches between images are exaggerated to make it easier for the reader to understand the events.

As described above, electrons on the front porch of the grouped electrons and those on portions delayed by $3 \times 10^{-17}$ sec. from the preceding portions are multiplied by the dynode, passing through the dynode in FIG. 13, and then collected at collecting electrode 312. The obtained electronic signals are amplified with amplifier 313. The output of the electronic image, formed corresponding to the respective portion of the grouped electrons, are fed from the amplifier 313.

Described hereinafter will be displaying of images on XY plotter 314 where the output of delay time control signal generator 310 and the output of amplifier 313 can be input to the X- and Y-coordinate input terminals, respectively.

For ease of understanding the events, we assume that electrons grouped corresponding to fluorescence which has occurred at the first time are deflected if driven by the deflection voltage generated when the output of delay time control signal generator 310 is set at 0 volt. We designate as 0 second the time that the output of delay time control signal generator 310 is set at 0 volt.

FIG. 5 shows the relationship between voltages at the X-coordinate input terminal of XY plotter 314 used as an output device and at the Y-coordinate input terminal thereof. The illustration in FIG. 5 indicates a graph on XY plotter 314. Values on the X-coordinate of XY plotter 314 are proportional to the input voltages, and the input voltages are proportional to the time elapsing from the reference point of time. An input voltage of 10 volts corresponds to a time of one second. Both the input voltage and time are given in the X-coordinate in FIG. 5.

Values on the Y-coordinate are proportional to the output current of electron tube 303. A current which corresponds to the front porch of the grouped electrons emitted corresponding to the pulse caused by fluorescence which has occurred at the first time is applied to the Y-coordinate input terminal of XY plotter 314. We assume that the current is 0 ampere at present. The input voltage at the X-coordinate input terminal is 0 volt during this state. The point for X=0 and Y=0 corresponds to the origin in FIG. 5. The current which corresponds to the front porch of the grouped electrons emitted corresponding to the pulse caused by fluorescence which has occurred at the second time is applied to the Y-coordinate input terminal of XY plotter 314. We define this current as $i_2$. The input voltage applied to the X-coordinate input terminal at that time is 100 nano volts.

Intensity "$i_n$" of light caused by fluorescence which has occurred at the n-th time is delayed by an amount of $(n-1) \times 3 \times 10^{-17}$ second from the front porch of the first pulse. When "$i_n$" input at the Y-coordinate input terminal of XY plotter 314 is plotted in terms of "$(n-1) \times 100$ nano volts" at the X-coordinate input terminal thereof, the brightness intensity distribution starting with the front porch of the first pulse for a period of three nano seconds can be plotted by sampling data on the X-coordinate into $10^8$ points. The width of the slit is set at about 0.01 mm to 0.1 mm when the slit electrode 334 of the electron tube has an effective diameter of about 30 mm, and thus the number of sampled points, which is set to be $10^8$, does not limit the spatial frequency response given by the slit.

Figure 15:
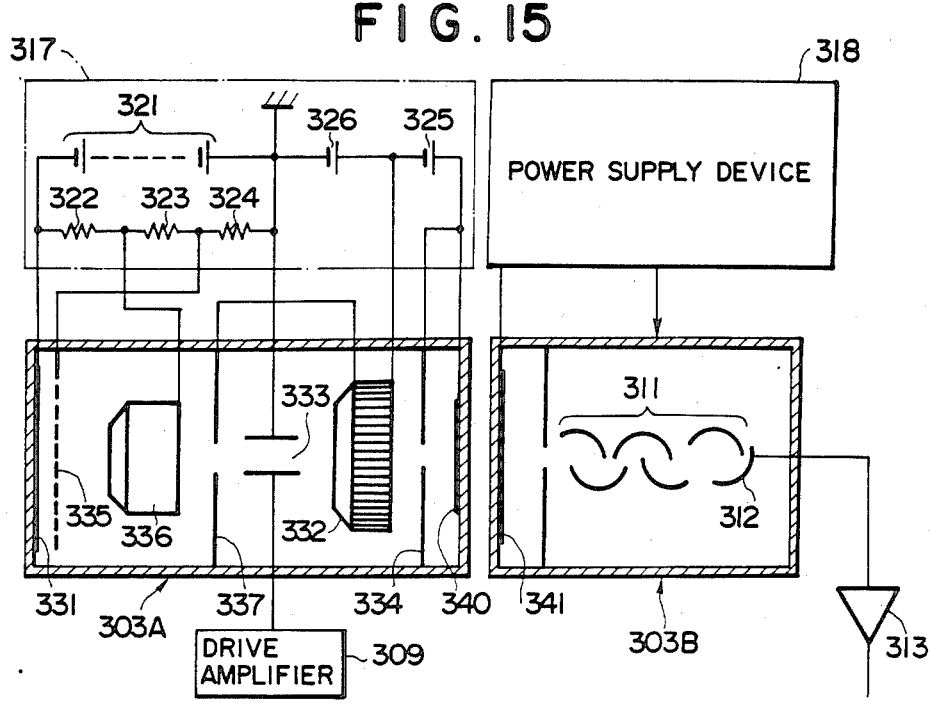
FIG. 15 shows a cross-sectional view and connections of the other electron tube device for measuring light pulses clocked at a high repetition rate in accordance with the present invention.

FIG. 15 shows a cross-sectional view and connections of further embodiment of the electron tube device for measuring the light pulses clocked at a high repetition rate in accordance with the present invention. The elements having the same functions as those appearing in FIG. 14 are identified by the same numbers.

The same functions as those of the electron tube are realized by using both a first electron tube having a photocathode and a phosphor layer, and a second electron tube consisting of a photoelectron multiplier tube to increase the brightness intensity on the phosphor layer.

The first electron tube 303A consists of photocathode 331, mesh electrode 335, focusing electrodes 336, aperture electrode 337, deflection electrode 333, microchannel-plate 332 to multiply electrons deflected by the deflection electrode 333, slit electrode 334 providing a slit in the direction perpendicular to the electric deflection field of the deflection electrode 333, and phosphor layer 340 to emit light due to electrons passing through the slit. These electrodes are sequentially arranged within a vacuum envelope constituting an electron tube.

Focusing electrode 336, deflection electrode 337, and slit electrode 334 are arranged in the same manner as in FIG. 14. Second electron tube 303B is a photoelectron multiplier tube consisting of photocathode 341, dynode 311, and collecting electrode 312. Power supply device 317 for first electron tube 303A is used to supply higher voltages to focusing electrode 336 with respect to photocathode 331 of the first electron tube 303A, to slit electrode 334 with respect to focusing electrode 336, and to phosphor layer 340 with respect to slit electrode 334.

Power supply device 318 for second electron tube 303B is used to supply operating voltage to the second electron tube 303B.

These power supply devices are almost the same as those in FIG. 13 in function. The power supply devices for the first and second electron tubes, however, are independent.

Drive amplifier 309 supplies a pair of deflection voltages in opposite polarities to the deflection electrode 337 in synchronization with the light pulses to be measured, and it constitutes the last stage of the deflection voltage generator.

This electron tube device can be used to measure the repetitive light pulses when connected to the peripheral circuits, as shown in FIG. 16, in the same manner as for the electron tube device in FIG. 13.

As described in the first embodiment of the present invention, a series of streaking images are successively displaced, in order, when a series of electric fields successively delayed in order at a repetition rate synchronizing with the incident light are applied to the deflection electrode so that a narrow-width stripe of optical image can be formed on the phosphor layer in the direction perpendicular to scanning of the streaking images while electrons for forming the streaking images passing through the slit with a narrow-width strike the phosphor layer. The obtained linear optical image is converted into the corresponding electric signal by means of a photoelectron multiplier tube, and a graph depicting the brightness intensity distribution of the streaking image by plotting the locus of the photoelectron multiplier tube output as that is swept at constant speed. The streaking image on the streaking tube in the first embodiment is not stored in the photoelectric conversion media. The photoelectron multiplier tube provides a very large dynamic range, and thus an instrument built in accordance with the present invention utilizing the photoelectron multiplier tube provides a dynamic range several thousand times that obtained by picking up the streaking image with a conventional television camera tube during measurement.

In the second embodiment of the present invention, a series of streaking images are successively displaced, in order, when a series of electric field successively delayed in order at a repetition rate synchronizing with the incident light are applied to the deflection electrode so that a narrow-width stripe of optical image can be formed on the phosphor layer in the direction perpendicular to scanning of the streaking images while electrons for forming the streaking images passing through the slit with a narrow width strike the phosphor layer. The obtained linear optical image is converted into the corresponding electric signal by means of a photoelectron multiplier tube, and a graph depicting the specific spectrum distribution of the streaking image by plotting the locus of the photoelectron multiplier tube output as the photoelectron multiplier tube output is swept at constant speed.

The opening of the partial pick-up plate in the second embodiment is movable and a series of wavelengths can be measured by moving the opening.

The streaking image on the streaking tube in the second embodiment is not stored in the photoelectron conversion media. The photomultiplier tube provides a very large dynamic range, and thus the instrument built in accordance with the present invention utilizing the photoelectron multiplier tube provides a dynamic range several thousand times that obtained by picking up the streaking image with a conventional television camera tube during measurement. In the third embodiment of the present invention, the light pulses clocked in the same interval with the same waveform can be measured by using specific electron tube device(s). A group of dynodes used in the electron tube device in the third embodiment of the present invention provide a very large dynamic range, and thus the device built in accordance with the present invention utilizing the dynodes provides a dynamic range several thousand times that obtained by picking up the streaking image with a conventional television camera tube during measurement.

Various modifications are allowed within the scope and spirit of the present invention.

In the first embodiment of the present invention, the output of the photoelectron multiplier tube is amplified and then input to the Y-coordinate of XY plotter 114 so that the first embodiment can easily be understood. The amplifier 113 is preferred to be a logarithmic amplifier to be used with an XY ploter 114 whose Y-coordinate is scaled by logarithmic scale. A variation whose amplifier is a logarithmic amplifier can accept an input with a large dynamic range and it confirms with the first embodiment of the present invention.

Sampling means to pass a portion of the streaking images in the first embodiment consist of a slit plate located beside the photoelectron multiplier tube. Sampling means, however, can be realized so that a linear optical image generated due to fluorescence can be obtained by using the streaking camera. Phosphor layer 134 of the streaking tube 103 is formed on the sealed vacuum envelope consisting of an optical fiber plate, and only a portion of the slit is transparent so that a linear optical image may be formed on the light emitting surface of the streaking tube. The linear optical image can be formed on the photocathode of the photoelectron multiplier tube by the use of optical means.

In the second embodiment of the present invention, an arbitrary portion of the diminished light pulses generated from a hematoprophyrin derivative can be measured. This method can favorably be used to measure the light pulses from the emission light source as shown in FIG. 8. The output of the photoelectron multiplier is amplified and then input to the Y-coordinate of XY plotter 214 so that the second embodiment can easily be understood. The amplifier 213 is preferred to be a logarithmic amplifier and to be used with an XY plotter 214 whose Y-coordinate is scaled by logarithmic scale. A variation whose amplifier is a logarithmic amplifier can accept an input with a large dynamic range and it conforms with the second embodiment of the present invention.

Sampling means to pass a portion of the streaking images in the second embodiment consist of a slit plate located beside the photoelectron multiplier tube. Sampling means, however, can be realized so that a linear optical image generated due to fluorescence can be obtained by the streaking camera. Phosphor layer 234 of the streaking tube 203 is formed on the sealed vacuum envelope consisting of an optical fiber plate, and only a portion of the slit is transparent so that a linear optical image may be formed on the light emitting surface of the streaking tube. The linear optical image can be formed on the photocathode of the photoelectron multiplier tube by means of optical means.

In the third embodiment of the present invention, electrons are multiplied by means of a micro-channel-plate, and the micro-channel-plate need not be used unless the light pulses to be measured are diminished.

What is claimed is:

1. An electron tube device for measuring light pulses generated at a high repetition rate comprising:
   an electron tube including
      an evacuated envelope; and
      a photocathode, a focusing electrode, a pair of deflection electrodes, an electrode having a slit therein extending in a direction perpendicular to an electric field applied between said electrodes, a group of dynodes for multiplying electrons passing through said slit and a collector electrode aligned within said envelope;
   a power supply device for supplying voltages to said focusing electrode, slit electrode and said dynodes, the voltage applied to said focusing electrode being higher than that applied to said photocathode and the voltages applied to said slit electrode being higher than that applied to said focusing electrode; and
   a deflection voltage generator coupled to said pair of deflection electrodes for applying deflection voltages thereto, said deflection voltages successively changing in phase with respect to light pulses impinging on said photocathode, whereby different portions of said light pulses are successively sampled.

2. An electron tube device for measuring light pulses generated at a high repetition rate comprising:
   a first electron tube including
      an evacuated envelope; and
      a photocathode, a focusing electrode, a pair of deflection electrodes, an electrode having a slit therein extending in a direction perpendicular to an electric field applied between said electrodes and a phosphor layer aligned within said envelope;
   a second electron tube comprising a secondary electron multiplier having a photocathode, said second electron tube being arranged with respect to said first electron tube so that the photocathode of said secondary electron multiplier faces said phosphor layer;
   a first electron tube power supply device for supplying voltages to said focusing and slit electrodes, the voltage applied to said focusing electrode being higher than that applied to said photocathode and the voltage applied to said slit electrode being higher than that applied to said focusing electrode;
   a second electron tube power supply for supplying power to said second electron tube; and
   a deflection voltage generator coupled to said pair of deflection electrodes for applying deflection voltages thereto, said deflection voltages successively changing in phase with respect to light pulse impinging on said photocathode, whereby different portions of said light pulses are successively sampled.

* * * * *